(12) United States Patent
Mathiowetz et al.

(10) Patent No.: US 7,526,802 B2
(45) Date of Patent: Apr. 28, 2009

(54) MEMORY AUTHENTICATION FOR INTRINSICALLY SAFE FIELD MAINTENANCE TOOLS

(75) Inventors: Brad N. Mathiowetz, Lakeville, MN (US); Christopher P. Kantzes, Minneapolis, MN (US); Gregory J. Opheim, St. Paul, MN (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 600 days.

(21) Appl. No.: 10/440,041

(22) Filed: May 16, 2003

(65) Prior Publication Data

US 2004/0230821 A1 Nov. 18, 2004

(51) Int. Cl.
*G06F 21/00* (2006.01)
(52) U.S. Cl. .............................. 726/16; 726/30; 713/168
(58) Field of Classification Search ....................... None
See application file for complete search history.

(56) References Cited

U.S. PATENT DOCUMENTS

| | | | |
|---|---|---|---|
| 3,774,693 A | 11/1973 | Orthman | 172/311 |
| 3,955,132 A | 5/1976 | Greenwood | 323/15 |
| 4,290,647 A | 9/1981 | Hensel et al. | 297/362 |
| 4,337,516 A | 6/1982 | Murphy et al. | 364/551 |
| 4,535,636 A | 8/1985 | Blackburn et al. | 73/831 |
| 4,630,265 A | 12/1986 | Sexton | 370/86 |
| 4,630,483 A | 12/1986 | Engdahl | 73/652 |
| 4,635,214 A | 1/1987 | Kasai et al. | 364/551 |
| 4,707,796 A | 11/1987 | Calabro et al. | 364/552 |
| 4,749,934 A | 6/1988 | Alexander et al. | 320/13 |
| 4,825,392 A | 4/1989 | Freeman | 364/550 |
| 4,954,923 A | 9/1990 | Hoeflich et al. | 361/111 |
| 4,964,125 A | 10/1990 | Kim | 371/15.1 |
| 4,988,990 A | 1/1991 | Warrior | 340/25.5 |
| 5,005,142 A | 4/1991 | Lipchak et al. | 364/550 |
| 5,099,539 A | 3/1992 | Forester | 15/144.3 |
| 5,103,409 A | 4/1992 | Shimizu et al. | 364/556 |
| 5,113,303 A | 5/1992 | Herres | 361/45 |
| 5,148,378 A | 9/1992 | Shibayama et al. | 364/571.07 |
| 5,150,289 A | 9/1992 | Badavas | 364/154 |
| 5,197,328 A | 3/1993 | Fitzgerald | 73/168 |
| 5,412,312 A | 5/1995 | Crass et al. | 324/122 |
| 5,426,774 A | 6/1995 | Banerjee et al. | 395/575 |
| 5,434,774 A | 7/1995 | Seberger | 364/172 |
| 5,442,639 A | 8/1995 | Crowder et al. | 371/20.1 |
| 5,469,156 A | 11/1995 | Kogure | 340/870.38 |
| 5,471,698 A | 12/1995 | Francis et al. | 15/144.1 |
| 5,481,200 A | 1/1996 | Voegele et al. | 324/718 |
| 5,501,107 A | 3/1996 | Snyder et al. | 73/862.23 |
| 5,570,300 A | 10/1996 | Henry et al. | 364/551.01 |
| 5,573,032 A | 11/1996 | Lenz et al. | 137/486 |
| 5,581,033 A | 12/1996 | Hess | 73/431 |
| 5,598,521 A | 1/1997 | Kilgore et al. | 395/326 |
| 5,623,605 A | 4/1997 | Keshav et al. | 395/200.17 |
| 5,665,899 A | 9/1997 | Willcox | 73/1.63 |
| 5,697,453 A | 12/1997 | Van Den Bosch | 172/41 |
| 5,742,845 A | 4/1998 | Wagner | 395/831 |
| 5,752,249 A | 5/1998 | Macon, Jr. et al. | 707/103 |
| 5,764,891 A | 6/1998 | Warrior | 395/200.2 |
| 5,771,287 A * | 6/1998 | Gilley et al. | 713/191 |
| 5,793,963 A | 8/1998 | Tapperson et al. | 395/200.31 |
| 5,828,567 A | 10/1998 | Eryurek et al. | 364/184 |
| 5,838,187 A | 11/1998 | Embree | 327/512 |
| 5,903,455 A | 5/1999 | Sharpe et al. | 700/83 |
| 5,909,368 A | 6/1999 | Nixon et al. | 364/131 |
| 5,923,557 A | 7/1999 | Eidson | 364/471.03 |
| 5,940,290 A | 8/1999 | Dixon | 364/138 |
| 5,956,663 A | 9/1999 | Eryurek | 702/183 |
| 5,960,214 A | 9/1999 | Sharpe, Jr. et al. | 395/835 |
| 5,970,430 A | 10/1999 | Burns et al. | 702/122 |
| 5,980,078 A | 11/1999 | Krivoshein et al. | 364/131 |
| 5,982,899 A * | 11/1999 | Probst | 713/1 |
| 5,995,916 A | 11/1999 | Nixon et al. | 702/182 |
| 6,017,143 A | 1/2000 | Eryurek et al. | 364/148.06 |
| 6,023,399 A | 2/2000 | Kogure | 364/23 |
| 6,026,352 A | 2/2000 | Burns et al. | 702/182 |
| 6,037,778 A | 3/2000 | Makhija | 324/433 |
| 6,047,222 A | 4/2000 | Burns et al. | 700/79 |
| 6,052,655 A | 4/2000 | Kobayashi et al. | 702/184 |
| 6,091,968 A | 7/2000 | Koohgoli et al. | 455/557 |

(Continued)

FOREIGN PATENT DOCUMENTS

EP    0 177 225 A1    9/1985

(Continued)

OTHER PUBLICATIONS

Schneier, B., "Applied Cryptography", 1996, John Wiley & Sons, 2nd Edition, pp. 30-31.*

(Continued)

*Primary Examiner*—Gilberto Barron, Jr.
*Assistant Examiner*—Minh Dinh
(74) *Attorney, Agent, or Firm*—Christopher R. Christenson; Westman, Champlin & Kelly, P.A.

(57) ABSTRACT

A memory authentication technique for field maintenance tools is provided. A non-volatile electronic memory includes a unique software identifier. A non-reversible algorithm is applied to the unique software identifier to obtain a result. The result is then encrypted and compared with a stored encrypted result previously stored on the electronic memory. Based upon this comparison, the tool can be fully enabled, fully disabled, or selectively enabled.

5 Claims, 2 Drawing Sheets

U.S. PATENT DOCUMENTS

| | | | | |
|---|---|---|---|---|
| 6,094,600 | A * | 7/2000 | Sharpe et al. | 700/19 |
| 6,098,095 | A | 8/2000 | Nelson et al. | 709/208 |
| 6,111,738 | A | 8/2000 | McGoogan | 361/91.5 |
| 6,119,047 | A | 9/2000 | Eryurek et al. | 700/28 |
| 6,179,964 | B1 | 1/2001 | Begemann et al. | 162/198 |
| 6,192,281 | B1 | 2/2001 | Brown et al. | 700/2 |
| 6,195,591 | B1 | 2/2001 | Nixon et al. | 700/83 |
| 6,199,018 | B1 | 3/2001 | Quist et al. | 702/34 |
| 6,211,623 | B1 | 4/2001 | Wilhelm et al. | 315/224 |
| 6,236,334 | B1 | 5/2001 | Tapperson et al. | 340/825.37 |
| 6,263,487 | B1 | 7/2001 | Stripf et al. | 717/1 |
| 6,270,920 | B1 | 8/2001 | Nakanishi et al. | 429/163 |
| 6,294,287 | B1 | 9/2001 | Lee et al. | 429/120 |
| 6,298,377 | B1 | 10/2001 | Hartkainen et al. | 709/223 |
| 6,304,934 | B1 | 10/2001 | Pimenta et al. | 710/129 |
| 6,307,483 | B1 | 10/2001 | Westfield et al. | 340/870.11 |
| 6,309,986 | B1 | 10/2001 | Flashinski et al. | 442/125 |
| 6,312,364 | B1 | 11/2001 | Selsam | 482/93 |
| 6,317,701 | B1 | 11/2001 | Pyotsia et al. | 702/188 |
| 6,324,607 | B1 | 11/2001 | Korowitz et al. | 710/102 |
| 6,356,191 | B1 | 3/2002 | Kirkpatrick et al. | 340/501 |
| 6,370,448 | B1 | 4/2002 | Eryurek | 700/282 |
| 6,377,859 | B1 | 4/2002 | Brown et al. | 700/79 |
| 6,386,456 | B1 | 5/2002 | Chen et al. | 235/487 |
| 6,397,114 | B1 | 5/2002 | Eryurek et al. | 700/51 |
| 6,434,504 | B1 | 8/2002 | Eryurek et al. | 702/130 |
| 6,444,350 | B1 | 9/2002 | Toya et al. | 429/90 |
| 6,449,574 | B1 | 9/2002 | Eryurek et al. | 702/99 |
| 6,473,710 | B1 | 10/2002 | Eryurek | 702/133 |
| 6,487,462 | B1 | 11/2002 | Reeves | 700/73 |
| 6,505,517 | B1 | 1/2003 | Eryurek et al. | 73/861.08 |
| 6,519,546 | B1 | 2/2003 | Eryurek et al. | 702/130 |
| 6,532,392 | B1 | 3/2003 | Eryurek et al. | 700/54 |
| 6,539,267 | B1 | 3/2003 | Eryurek et al. | 700/51 |
| 6,539,384 | B1 | 3/2003 | Zellner et al. | 707/10 |
| 6,594,603 | B1 | 7/2003 | Eryurek et al. | 702/104 |
| 6,594,621 | B1 | 7/2003 | Meeker | 702/185 |
| 6,598,828 | B2 | 7/2003 | Fiebick et al. | 244/118.1 |
| 6,601,005 | B1 | 7/2003 | Eryurek et al. | 702/104 |
| 6,611,775 | B1 | 8/2003 | Coursolle et al. | 702/65 |
| 6,615,149 | B1 | 9/2003 | Wehrs | 702/76 |
| 6,629,059 | B2 | 9/2003 | Borgeson et al. | 702/183 |
| 6,654,697 | B1 | 11/2003 | Eryurek et al. | 702/47 |
| 6,656,145 | B1 | 12/2003 | Morton | 602/27 |
| 6,697,681 | B1 | 2/2004 | Stoddard et al. | 700/17 |
| 6,714,969 | B1 | 3/2004 | Klein et al. | 709/219 |
| 6,733,376 | B2 | 5/2004 | Williams | 451/344 |
| 6,748,631 | B2 | 6/2004 | Iguchi et al. | 24/265 WS |
| 6,775,271 | B1 | 8/2004 | Johnson et al. | 370/352 |
| 6,789,205 | B1 * | 9/2004 | Patino et al. | 713/300 |
| 6,834,347 | B2 * | 12/2004 | Goodman et al. | 713/191 |
| 6,851,612 | B2 | 2/2005 | Iasso et al. | 235/472.01 |
| 6,889,166 | B2 | 5/2005 | Zielinski et al. | 702/183 |
| 6,993,664 | B2 | 1/2006 | Padole et al. | 713/200 |
| 2001/0053065 | A1 | 12/2001 | Cudini et al. | 361/728 |
| 2002/0004370 | A1 | 1/2002 | Stengele et al. | |
| 2002/0049909 | A1 * | 4/2002 | Jackson et al. | 713/188 |
| 2002/0065631 | A1 | 5/2002 | Loechner | |
| 2002/0077711 | A1 | 6/2002 | Nixon et al. | |
| 2002/0116540 | A1 | 8/2002 | Maeda et al. | 709/317 |
| 2002/0123864 | A1 | 9/2002 | Eryurek et al. | |
| 2003/0017383 | A1 | 1/2003 | Ura et al. | 429/120 |
| 2003/0023408 | A1 | 1/2003 | Wight et al. | |
| 2003/0023795 | A1 | 1/2003 | Packwood et al. | |
| 2003/0033040 | A1 | 2/2003 | Billings | 700/97 |
| 2003/0058277 | A1 | 3/2003 | Bowman-Amuah | |
| 2003/0119568 | A1 | 6/2003 | Menard | 455/572 |
| 2003/0158795 | A1 | 8/2003 | Markham et al. | |
| 2003/0181074 | A1 | 9/2003 | Liu | 439/67 |
| 2003/0204373 | A1 | 10/2003 | Zielinski et al. | 702/184 |
| 2004/0148503 | A1 | 7/2004 | Sidman | 713/167 |
| 2004/0172526 | A1 * | 9/2004 | Tann et al. | 713/2 |
| 2004/0225796 | A1 | 11/2004 | Hanson et al. | 710/301 |
| 2004/0230327 | A1 | 11/2004 | Opheim et al. | 700/83 |
| 2004/0230899 | A1 | 11/2004 | Pagnano et al. | 715/513 |
| 2004/0248619 | A1 | 12/2004 | Graiger et al. | 455/566 |
| 2005/0036372 | A1 | 2/2005 | Sasaki | 365/202 |
| 2006/0094466 | A1 | 5/2006 | Tran | 455/558 |

FOREIGN PATENT DOCUMENTS

| | | |
|---|---|---|
| EP | 0 633 420 A2 | 1/1995 |
| EP | 0 676 818 B1 | 10/1995 |
| EP | 1022626 A2 | 7/2000 |
| GB | 1 387 619 A | 3/1975 |
| GB | 2347232 | 8/2000 |
| JP | 2753592 | 1/1990 |
| JP | 2001-70224 | 3/2001 |
| WO | WO/96/12993 | 5/1996 |
| WO | WO/97/21157 | 6/1997 |
| WO | WO/98/14855 | 4/1998 |
| WO | WO/98/39718 | 9/1998 |
| WO | WO/00/41050 | 7/2000 |
| WO | WO 00/55700 | 9/2000 |
| WO | WO 01/80331 | 10/2001 |
| WO | WO 01/02891 A2 | 11/2001 |
| WO | WO/02/27418 | 4/2002 |

OTHER PUBLICATIONS

"Panasonic Makes SD Technology More Accessible and Affordable", PR Newswire, Jul. 2001, Retrieved from the Internet on Dec. 15, 2006: <URL: http://proquest.umi.com/pqdweb?did=75198117&sid=3&Fmt=3&clientId=19649&RQT=309&VName=PQD>.*

Kaufman et al., "Network Security—Private Communication in a Public World," 1995, Prentice Hall PTR, pp. 53-55.*

Product Data Sheet: Asset Management Solutions—HART Communicator, Jan. 2001, Retrieved from the Internet on Dec. 17, 2007: <URL: http://www.peabprocess.se/Templates/send_file_pr.asp?ID=196>.*

U.S. Appl. No. 09/384,876, filed Aug. 27, 1999, Eryurek et al.

U.S. Appl. No. 09/409,098, filed Sep. 30, 1999, Eryurek et al.

U.S. Appl. No. 09/799,824, filed Mar. 5, 2001, Rome et al.

U.S. Appl. No. 09/852,102, filed May 9, 2001, Eryurek et al.

U.S. Appl. No. 09/855,179, filed May 14, 2001, Eryurek et al.

U.S. Appl. No. 10/790,627, filed Mar. 6, 2003, Mathiowetz.

U.S. Appl. No. 10/438,386, filed May 13, 2003, Mathiowetz et al.

U.S. Appl. No. 10/440,047, filed May 16, 2003, Kantzes et al.

U.S. Appl. No. 10/426,894, filed Apr. 30, 2003, Duren et al.

U.S. Appl. No. 10/438,401, filed May 16, 2003, Opheim et al.

U.S. Appl. No. 10/440,434, filed May 16, 2003, DelaCruz et al.

U.S. Appl. No. 10/435,819, filed May 12, 2003, Kantzes et al.

U.S. Appl. No. 10/440,048, filed May 16, 2003, Duren et al.

U.S. Appl. No. 10/440,444, filed May 16, 2003, Mathiowetz et al.

U.S. Appl. No. 10/439,660, filed May 16, 2003, Mathiowetz et al.

U.S. Appl. No. 10/439,764, filed May 16, 2003, Mathiowetz.

U.S. Appl. No. 10/310,703, filed Dec. 5, 2002, Zielinski et al.

U.S. Appl. No. 10/440,041, filed May 16, 2003, Mathiowetz et al.

U.S. Appl. No. 10/440,441, filed May 16, 2003, Mathiowetz et al.

Fluke 179 Multimeter & ToolPak Combo Pack, http://www.fluke.com/MULTIMETER/TOOLPAK .ASP?AGID=6&SID=260 (2 pages).

"Multifunction PDA Calibrator Transmation Model 3-PMF1," Transmation, Apr. 2001.

"AAPA 60 & 90 Series Multimeter," http://www.appatech.com/a-60new.htm (5 pages).

"Fieldbus Standard for Use in Industrial Control Systems Part 2: Physical Layer Specification and Service Definition", ISA-S50.02-1992, pp. 1-93.

Hart Communications, Technical Information, Part 4 Communications, Samson, Frankfurt.

"Fieldbus Brings Protocol to Process Control," Santori et al., IEEE Spectrum, vol. 33, Issue 3, Mar. 1996, pp. 60-64.

"Computerized Maintenance systems-an Overview of Two Basic Types for Field Devices," Medlin, IEEE Pulp and Pater Industry Technical Conference, Jun. 21-25, 1999, pp. 230-232.

"Fieldbus in the Process Control Laboratory-its Time has Come," Rehg. et al., ASEE/IEEE Frontiers in Education Conference, vol. 3, Nov. 1999, pp. 13B4/12-13B4/17.

"Generic Device Description for Complex HART Field Devices," Zulkifi et al., IEE 8th International Conference on Communication Systems, vol. 2, Nov. 25-28, 2002, pp. 646-650.

"SFC Smart Field Communicator-Model STS103," Honeywell, Specification, Dec. 1995, pp. 1-4.

"SFC Smart Field Communicator-Models SFC160/SFC260," Yamatake, Specification Apr. 1999, pp. 1-6.

"HART Communicator," Fisher-Rosemount, Product Manual, Jul. 2000, pp. i-iv, ix-x, 1-1-1-40—2-1-2-8—3-1-3-38—A-1-A6—B-1-B6—C-1-C4—D-1-D-4 and I-1 1-2.

Shoji et al., Fieldbus System Engineering, 1999, Yokogawa Technical Report.

Diedrich et al., Field Device Integration in DCS Engineering Using a Device Model, 1998, IEEE.

Simon et al., Field Devices—Models and Their Realizations, 11-14, Dec. 2002, Industrial Technology, IEEE ICIT 2002, IEEE International Conference, vol. 1, pp. 307-312.

"HART Communicator," Asset Management Solutions, Fisher-Rosemount, Bulletin 62.1: Communicator, Jan. 2001, pp. 1-7.

"Honeywell Introduces Pocket PC-based Toolkit for Configuring, Monitoring, Diagnosing, and Managing Smart Field Instruments," Oct. 21, 2002, Cyndi Bloom, Honeywell, 2 pages.

The Chinese Office Action in foreign application No. 200410043322.0 filed May 14, 2004.

Dewey, Fieldbus Device Maintenance—Do I Need To Go To the Field Anymore?, The Instrumentation, Systems and Automation Society, ISA 2000.

The Examination Report from Applicaiton No. 04252805.9, filed May 14, 2002.

The first Communication from Application No. 05826038.1, filed Nov. 9, 2005.

"Notification of Transmittal of the International Search Report or the Declaration", PCT/US2004/006203.

The Chinese OA in foreign application No. 200410043322.0, filed May 14, 2004.

* cited by examiner

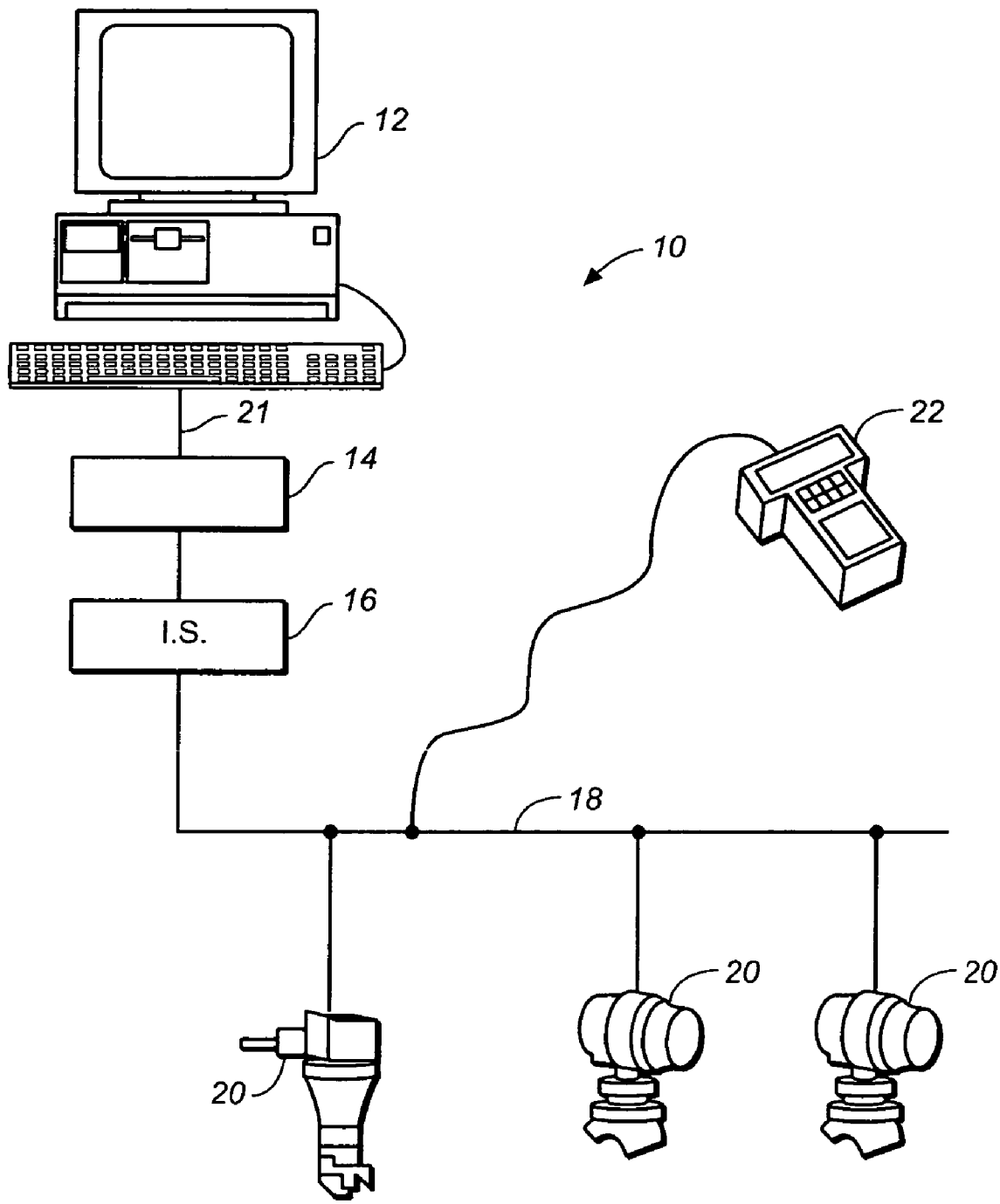
FIG._1

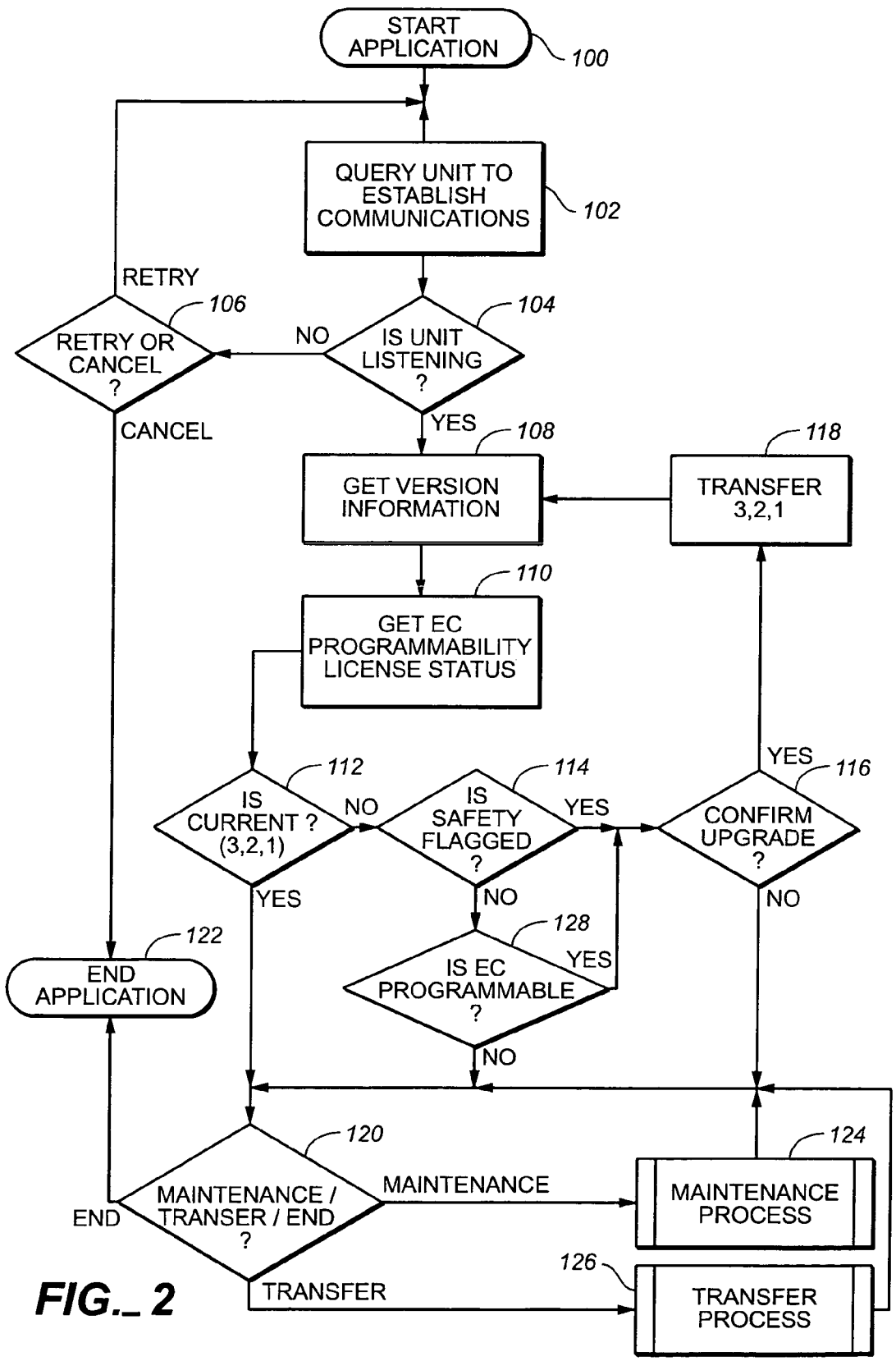
FIG._2

MEMORY AUTHENTICATION FOR INTRINSICALLY SAFE FIELD MAINTENANCE TOOLS

BACKGROUND OF THE INVENTION

Intrinsically safe field maintenance tools are known. Such tools are highly useful in the process control and measurement industry to allow operators to conveniently communicate with and/or interrogate field devices in a given process installation. Examples of such process installations include petroleum, pharmaceutical, chemical, pulp and other processing installations. In such installations, the process control and measurement network may include tens or even hundreds of various field devices which periodically require maintenance to ensure that such devices are functioning properly and/or calibrated. Moreover, when one or more errors in the process control and measurement installation is detected, the use of an intrinsically safe handheld field maintenance tool allows technicians to quickly diagnose such errors in the field.

One such device is sold under the trade designation Model 275 HART® Communicator available from Fisher-Rosemount Systems, Inc., of Eden Prairie, Minnesota. HART® is a registered trademark of the HART® Communication Foundation. The Model 275 provides a host of important functions and capabilities and generally allows highly effective field maintenance.

Intrinsic Safety requirements are intended to guarantee that instrument operation or failure cannot cause ignition if the instrument is properly installed in an environment that contains explosive gases. This is accomplished by limiting the maximum energy stored in the transmitter in a worst case failure situation. Excessive energy discharge may lead to sparking or excessive heat, which could ignite an explosive environment in which the transmitter may be operating.

Examples of intrinsic safety standards include European CENELEC standards EN50014 and 50020, Factory Mutual Standard FM3610, the Canadian Standard Association, the British Approval Service for Electrical Equipment in Flammable Atmospheres, the Japanese Industrial Standard, and the Standards Association of Australia.

In order to ensure stringent compliance with automation industry safety protocols and specifications, only equipment certified by an independent agency can be used in such locations. Any component of a handheld field maintenance tool which is removable must be replaced with another component that also satisfies all requisite safety requirements.

Another difficulty for modern intrinsically safe handheld field maintenance tools is that such tools can be provided with varying levels of functionality. Often times this functionality is controlled by software selections that are generated based upon a user purchasing specific groups of functionality. Since electric removable storage media usable with such devices is inherently portable, it is important to provide an authentication regime that not only ensures that electronic memory placed within the handheld field maintenance tool complies with intrinsic safety requirements, but also that such memory contains licensed code and not unauthorized software.

SUMMARY OF THE INVENTION

A memory authentication technique for field maintenance tools is provided. A non-volatile electronic memory includes a unique software identifier. A non-reversible algorithm is applied to the unique software identifier to obtain a result. The result is then encrypted and compared with a stored encrypted result previously stored on the electronic memory. Based upon this comparison, the tool can be fully enabled, fully disabled, or selectively enabled.

BRIEF DESCRIPTION OF THE DRAWINGS

FIG. 1 is a diagrammatic view of an industrial process control and measurement environment in which embodiments of the invention are useful.

FIG. 2 is a flow diagram of a method for authenticating electronic non-volatile memory for a handheld field maintenance tool in accordance with the embodiment of the present invention.

DETAILED DESCRIPTION OF THE PREFERRED EMBODIMENTS

FIG. 1 illustrates an exemplary system in which embodiments of the present invention are useful. System 10 includes controller 12, I/O and control sub-system 14, intrinsic safety (IS) barrier 16, process communication loop 18 and field devices 20. Controller 12 is coupled to I/O and control sub-system 14 via link 21 which can be any suitable link such as a local area network (LAN) operating in accordance with Ethernet signaling protocols or any other suitable protocol. I/O and control sub-system 14 is coupled to intrinsic safety barrier 16 which in turn is coupled to process communication loop 18 to allow data communication between loop 18 and I/O and control sub-system 14 in a manner that limits energy passing therethrough.

In this illustration, process communication or process control loop 18 is a FOUNDATION™ fieldbus process communication loop and is coupled to field devices 20, which are shown coupled arranged in a multi-drop configuration. An alternative process communication loop (not shown) is an HART® process communication loop. FIG. 1 illustrates a multi-drop wiring configuration that vastly simplifies system wiring compared to other topologies such as the star topology. Multi-drop HART® configurations support a maximum of 15 devices, while multi-drop FOUNDATION™ Fieldbus configurations support a maximum of 32 devices.

While embodiments of the present invention will be described with respect to Secure Digital (SD) memory cards, it is expressly contemplated that embodiments of the present invention may be practiced with any form of electronic non-volatile memory.

The Secure Digital card is a very secure small-sized flash memory card. The SD card is currently used in a wide variety of consumer products. Such products include, for example, digital video camcorders, digital music players, car navigation systems, smart phones, electronic books, cellular phones and handheld computing devices. Each SD card has a unique software identifier known as the CID. This software identifier is in essence a unique serial number but can also be defined to mean other information. It should be noted that the CID is permanently stored on the SD card and not changeable by re-formatting the SD card. This unique, non-changeable software identifier can be used by an application in the handheld tool to ensure that the memory card is approved for use in a hazardous environment as well as for authenticating one or more aspects of software licensing for software contained within the electronic memory card. For example, to guard against copyright violations of a software application, an Identification Code file (that resides as a hidden file on the SD card) is created based upon the software identifier (CID). This Identification Code file is created by running the software identifier (CID) through an algorithm and then encrypting the results such that the process cannot be reverse-engineered.

This process can be performed by encoding of the file checksum followed by encryption of the entire file (including the checksum) using a keyed exclusive OR pattern, for example.

When the electronic memory card is placed into its host unit (handheld field maintenance tool) an application in the host reads both the software identifier and the Identification Code file. The host then repeats the process of running the software identifier through the algorithm and encrypting the results. This result is then compared to that contained in the Identification Code file. Only the card that has a valid Identification Code file will match the host-generated result. Only that unit will become functional. In units where a mismatch occurs, all or parts of the functionality of the tool will be disabled. If the Identification Code file was copied from one SD card to another, the host-generated result will not match that contained in the Identification Code file. The host would then use the software identifier of the new SD card while the file contained a result generated with the original software identifier.

To increase the flexibility of this authentication technique, the algorithm can also include a series of options that make the resultant Identification Code file unique to one or more selected options. For example, this includes the option to allow for programming of the handheld tool as well as the option to allow execution of a FOUNDATION™ Fieldbus application on the tool.

Once the process described above determines that the electronic memory card is valid for use with the handheld field maintenance tool, the tool can then read the Identification Code file to determine which option(s) are to be enabled on the handheld tool. In other words, the handheld tool can be shipped containing all of the hardware and software necessary for various options, with only options purchased by the user authorized and accordingly enabled.

For a user to license additional functionality, the Identification Code file for a particular SD card is replaced or modified. This can be done by replacing the entire card with one that contains the desired license, or it can be done through an external connection of the handheld field maintenance tool. Preferably, the handheld field maintenance tool will contain an infrared data access port that can be used to interface to a personal computer or in some cases directly to a network such as the internet. In either case, the user can access a website, or other destination, that contains an upgrade application. When the user starts the process, a request is made to have the software identifier and the license information passed to the internet database. An interactive application on a remote device, such as a server, will then display the license identity of the electronic media card. The user can then select which additional functionality he or she would like to add. At this point, a financial exchange, password or some other appropriate means of managing this feature is enforced. Once the step is complete, an Identification Code file based on the SD card software identifier and the newly licensed functionality is created via a new Identification Code file. This new file is sent to the portable tool via the personal computer and the infrared data access interface. The host unit will now contain functionality based on the new licensing.

The Identification Code file also preferably contains information that identifies the SD card as qualifying or otherwise meeting one or more requisite safety criteria for use in a hazardous area. Thus, not only will software licensing be facilitated, but only the use of approved memory cards will occur in the hazardous environments sometimes found in the process industry field.

FIG. 2 is a flow diagram of a method for authenticating electronic non-volatile memory for a handheld field maintenance device, and/or authenticating software licenses thereon. At block 100, an application on an external computing device such as desktop computer, is started. The external computing device is coupled to handheld field maintenance tool 22, preferably via an infrared data access port, and at block 102, the handheld field maintenance tool is queried to establish communications between the external computing device and the handheld field maintenance tool.

At block 104, it is determined whether the handheld field maintenance tool has successfully established communications with the external computing device. If communications have not been established, control returns via block 106 to block 102 where communications are attempted again. In the event that the handheld field maintenance tool does establish communications with the external computing device, a request is sent from the external computing device to the handheld field maintenance tool for the tool to provide the software version information for the tool to the external computing device, as indicated at block 108. Subsequently, at block 110, the programmable license status is queried from the handheld field maintenance tool. At block 112, the queried information is reviewed to determine if both the software version and the license status are current. If this determination is in the negative, control passes to block 114 where it is determined whether the handheld field maintenance tool is safety flagged. In other words, it is determined whether the Identification Code file contains information indicating that the SD card within the handheld field maintenance tool complies with requisite safety regulations.

If the handheld field maintenance tool is flagged for safety regulations, control passes to block 116 where information is sent to the application to have the user thereof confirm an upgrade. If the user confirms the upgrade, control passes to block 118 where upgraded handheld field maintenance tool software and/or license information is passed to the handheld field maintenance tool. After block 118, control returns to block 108 where the handheld field maintenance tool software version information is queried again.

If during block 116, the user does not confirm the software and/or functionality upgrade, control passes to block 120 which determines whether the user of the application has finished maintenance/transfer operations. If the user indicates that he or she is finished, control passes to block 122 where the application on the external computing device ends. However, if the user indicates that further maintenance is required, then control passes to block 124 and a maintenance process is executed. If at block 120 the user indicates that a transfer process is requested, then control passes to block 126 where such process is initiated.

Returning to the determination at block 114 regarding whether the handheld field maintenance tool is safety flagged, if that determination is in the negative, then control passes to block 128 where it is determined whether the electronic memory is programmable. If the memory is not programmable, control passes to block 120. However, if the memory is programmable, control passes to block 116 and thereafter as indicated above.

Although the present invention has been described with reference to preferred embodiments, workers skilled in the art will recognize that changes may be made in form and detail without departing from the spirit and scope of the invention. For example, while authentication has been described above using the unique software identifier on the memory, additional unique identifiers, such as a serial number of the handheld tool, can be used to essentially lock a memory card to a handheld tool.

What is claimed is:

1. A method for authenticating electronic removable nonvolatile memory in a handheld field maintenance tool, the method comprising:

applying a non-reversible algorithm to a unique, non-changeable serial number of the memory to obtain a result; encrypting the result;

comparing the encrypted result with a stored encrypted result stored on the memory;

enabling the handheld field maintenance tool by enabling selected functions of the tool if the encrypted result matches the stored encrypted result; and fully disabling the handheld field maintenance tool if the encrypted result does not match the stored encrypted result.

2. The method of claim 1, wherein the stored encrypted result is indicative of compliance with intrinsic safety.

3. The method of claim 1, wherein the stored encrypted result is indicative of a software license.

4. The method of claim 1, wherein the memory is a Secure Digital (SD) memory.

5. The method of claim 1, wherein the memory complies with intrinsic safety.

* * * * *